(12) United States Patent
Yamaguchi (10) Patent No.: US 7,187,954 B2
(45) Date of Patent: Mar. 6, 2007

(54) SEMICONDUCTOR INTEGRATED CIRCUIT FOR RADIO COMMUNICATION

(75) Inventor: Satoshi Yamaguchi, Sagamihara (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 336 days.

(21) Appl. No.: 10/975,302

(22) Filed: Oct. 28, 2004

(65) Prior Publication Data
US 2005/0107116 A1    May 19, 2005

(30) Foreign Application Priority Data
Nov. 14, 2003    (JP)    ............................. 2003-385105

(51) Int. Cl.
H04B 1/38    (2006.01)
(52) U.S. Cl. .................. 455/574; 455/333; 455/127.5; 455/127.3
(58) Field of Classification Search ............. 455/127.1, 455/127.2, 127.3, 127.4, 5, 550, 572, 574, 455/205, 207, 208, 212, 213, 255, 313, 323, 455/333, 338, 339, 341
See application file for complete search history.

(56) References Cited

U.S. PATENT DOCUMENTS 5,471,652 A * 11/1995 Hulkko ........................ 455/76
6,094,236 A * 7/2000 Abe et al. ..................... 348/731
6,690,949 B1 * 2/2004 Shamlou et al. ............. 455/557
7,095,999 B2 * 8/2006 Kasa et al. ................... 455/333
2002/0032009 A1 * 3/2002 Otaka et al. ................... 455/83
2004/0009752 A1 * 1/2004 Mohan ......................... 455/78

FOREIGN PATENT DOCUMENTS

| JP | 61-13827 | 1/1986 |
|----|----------|--------|
| JP | 6-232349 | 8/1994 |
| JP | 7-131404 | 5/1995 |

* cited by examiner

*Primary Examiner*—Edward Urban
*Assistant Examiner*—Nhan T. Le
(74) *Attorney, Agent, or Firm*—Hamre, Schumann, Mueller & Larson, P.C.

(57) ABSTRACT

A semiconductor integrated circuit for radio communication includes a receiving-system high frequency block, a receiving-system voice band block, a transmitting-system voice band block, a transmitting-system high frequency block, and a power source control circuit for performing power source control to operate/stop each of the groups of circuits based on a power source control signal. The power source control circuit performs individual power source control for at least one circuit of the multiplier, the noise detector, the voice signal power amplifier, and the voice signal level detector, and also performs the power source control for each of the receiving-system high frequency block, the receiving-system voice band block, the transmitting-system voice band block, and the transmitting-system high frequency block, except for the at least one circuit subjected to the individual power source control.

6 Claims, 7 Drawing Sheets

SEMICONDUCTOR INTEGRATED CIRCUIT FOR RADIO COMMUNICATION

FIELD OF THE INVENTION

The present invention relates to a semiconductor integrated circuit for radio communication. More particularly, the present invention relates to a semiconductor integrated circuit for radio communication that uses a power source control system capable of operating/stopping a plurality of circuits together as a single functional block or separately as individual circuits.

BACKGROUND OF THE INVENTION

When a semiconductor integrated circuit for radio communication is used in an apparatus for mobile communication, power consumption needs to be minimized for prolonged battery life. To achieve this, power source control is performed so that the operation of a circuit involved in a function that is not currently used during the call waiting state or the like, is stopped. For example, JP H06-232349A describes power source control that is performed to operate/stop each functional block, but not individual circuits separately. In other words, a different power source control is performed for each functional block in order to stop the supply of power to a block that is not currently used so as to stop the operation of the block.

In the above-described technology using the power source control system, however, operation/stop is performed for each functional block comprising a set of circuits. Among individual circuits contained in a functional block, power is supplied to a circuit(s) not in use when the corresponding functional block is operated, so that current is wastefully consumed.

For example, only a voice signal power amplifier is required to be operated when outputting a transmission data signal to a loudspeaker. However, when power source control is performed on the each functional block basis, it is required to operate a whole block for processing a receiving voice band signal, resulting in wasteful current consumption. Furthermore, when a semiconductor integrated circuit for radio communication having a voice signal level detector is used, even in a radio communication apparatus that does not use a voice signal level detector, it is required to operate a whole block for processing a transmission voice band signal, resulting in wasteful current consumption. Also, there is a problem with a noise detector that is used in combination with an intermediate frequency detector for the purpose of detecting the level of a receiving signal. That is, taking into account the stage of detecting the receiving signal level, the operation of the noise detector is effective only when the receiving signal level can be detected by the intermediate frequency detector placed near a receiving signal input terminal. However, when power source control is performed on the each functional block basis, it is required to operate a whole block for processing a receiving high frequency signal, resulting in wasteful current consumption.

On the other hand, when power source control is performed on the each functional block basis only for the purpose of reducing current consumption, load fluctuation associated with the operation/stop of an element circuit has an influence on another element circuit connected thereto in the same functional block, resulting in deterioration of the rising characteristics of a power source.

Figure 8:
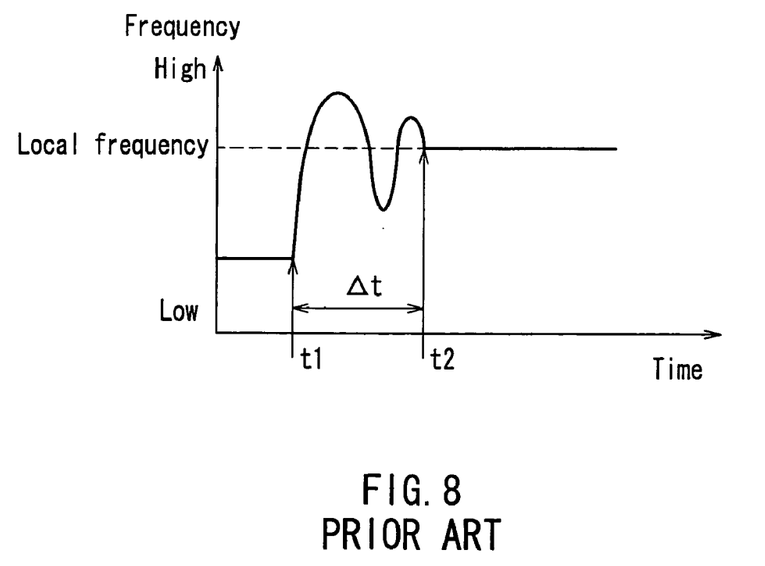
FIG. 8 is a diagram showing output frequency characteristics of a local oscillator in a conventional semiconductor integrated circuit for radio communication.

FIG. 8 shows the output frequency characteristics of a local oscillator in a conventional semiconductor integrated circuit for radio communication. In this example, a multiplier for generating an intermediate frequency signal based on a receiving signal and a local frequency signal and a local oscillator are subjected as a receiving-system high frequency block to the same power source control. FIG. 8 shows a frequency change of a local frequency signal output from the local oscillator when the multiplier and the local oscillator start operating simultaneously. t1 represents the operation start time of a receiving-system high frequency block and t2 represents a time at which the frequency of the local oscillator becomes stable. Δt represents an interval between t1 and t2, indicating an elapsed time from the start of operation of the receiving-system high frequency block until the frequency of the local oscillator becomes stable. The output of the local oscillator is coupled to the input of the multiplier. Therefore, when the local oscillator and the multiplier start operating simultaneously, the local oscillator is operated before the input impedance of the multiplier becomes stable. For this reason, it takes a long time for the frequency of the local oscillator to become stable.

SUMMARY OF THE INVENTION

It is an object of the present invention to provide a semiconductor integrated circuit for radio communication having a power source control system capable of operating/stopping element circuits not only together as a single functional block but also separately as individual circuits, thereby making it possible to reduce current consumption and improve the rising characteristics of a power source.

The semiconductor integrated circuit for radio communication of the present invention includes a receiving-system high frequency block including a group of circuits for processing a received high frequency signal, a receiving-system voice band block including a group of circuits for processing a received voice band signal, a transmitting-system voice band block including a group of circuits for processing a transmission voice band signal, a transmitting-system high frequency block including a group of circuits for processing a transmission high frequency signal, and a power source control circuit for performing power source control to operate/stop each of the groups of circuits based on a power source control signal.

The receiving-system high frequency block includes a local oscillator for outputting a local frequency signal, a multiplier for receiving an output of the local oscillator and the received signal as inputs and outputting an intermediate frequency signal, an intermediate frequency bandpass filter for separating an intermediate frequency signal from an output of the multiplier, an intermediate frequency amplifier for amplifying an intermediate frequency signal output from the intermediate frequency bandpass filter, an intermediate frequency detector for detecting a level of an intermediate frequency output from the intermediate frequency amplifier, a demodulator for demodulating a signal output from the intermediate frequency amplifier, and a noise detector for detecting a level of demodulation noise in a signal output from the demodulator.

The receiving-system voice band block includes a received voice signal amplifier for amplifying a demodulation output of the demodulator, a received voice signal bandpass filter for separating a received voice signal from an output of the received voice signal amplifier, and a voice signal power amplifier for driving a loudspeaker based on an output of the received voice signal bandpass filter and an output of a data signal amplifier included in the group of circuits for processing the transmission voice band signal.

The transmitting-system voice band block includes the data signal amplifier for amplifying a data signal, a data signal lowpass filter for separating a data signal from an output of the data signal amplifier, a transmission voice signal amplifier for amplifying a transmission voice signal, a transmission voice signal bandpass filter for separating a transmission voice signal from an output of the transmission voice signal amplifier, and a voice signal level detector for detecting a level of a transmission voice signal based on an output of the transmission voice signal amplifier.

The transmitting-system high frequency block includes a modulator for receiving and modulating an output of the data signal lowpass filter and an output of the transmission voice signal bandpass filter, and a transmission signal generator for outputting a transmission signal based on an output of the modulator.

The power source control circuit performs individual power source control for at least one circuit of the multiplier, the noise detector, the voice signal power amplifier, and the voice signal level detector, and performs the power source control for each of the receiving-system high frequency block, the receiving-system voice band block, the transmitting-system voice band block, and the transmitting-system high frequency block, except for the at least one circuit subjected to the individual power source control.

DESCRIPTION OF THE PREFERRED EMBODIMENTS

According to the semiconductor integrated circuit for radio communication of the present invention, element circuits can be operated/stopped not only together for each unit functional block but also separately as individual circuits, thereby making it possible to effectively reduce current consumption.

In the semiconductor integrated circuit for radio communication of the present invention, the power source control circuit may be configured so as to perform individual power source control for each of the multiplier, the noise detector, the voice signal power amplifier, and the voice signal level detector, and perform the power source control for each of the receiving-system high frequency block except for the multiplier and the noise detector, the receiving-system voice band block except for the voice signal power amplifier, the transmitting-system voice band block except for the voice signal level detector, and the transmitting-system high frequency block.

Alternatively, the power source control circuit may be configured so as to perform individual power source control for the voice signal power amplifier, and perform the power source control for each of the receiving-system high frequency block, the receiving-system voice band block except for the voice signal power amplifier, the transmitting-system voice band block, and the transmitting-system high frequency block.

Alternatively, the power source control circuit may be configured so as to perform individual power source control for the voice signal level detector, and perform the power source control for each of the receiving-system high frequency block, the receiving-system voice band block, the transmitting-system voice band block except for the voice signal level detector, and the transmitting-system high frequency block.

Alternatively, the power source control circuit may be configured so as to perform individual power source control for the noise detector, and perform the power source control for each of the receiving-system high frequency block except for the noise detector, the receiving-system voice band block, the transmitting-system voice band block, and the transmitting-system high frequency block.

Alternatively, the power source control circuit may be configured so as to perform individual power source control for the multiplier, and perform the power source control for each of the receiving-system high frequency block except for the multiplier, the receiving-system voice band block, the transmitting-system voice band block, and the transmitting-system high frequency block.

Hereinafter, the semiconductor integrated circuit for radio communication of the present invention will be described by way of embodiments with reference to the accompanying drawings.

Figure 1:
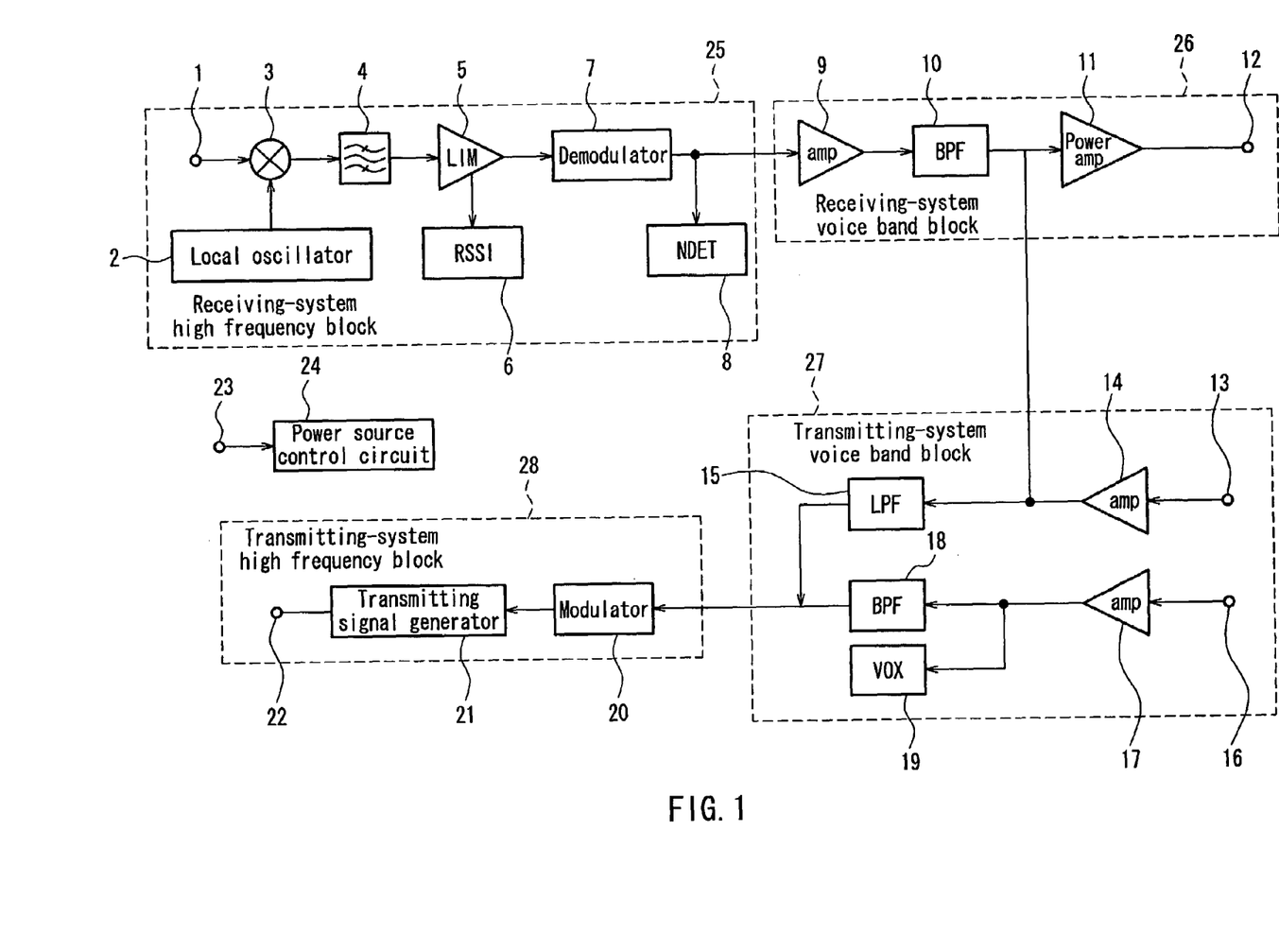
FIG. 1 is a block diagram showing a basic configuration of a semiconductor integrated circuit for radio communication according to an embodiment of the present invention.

In embodiments of the present invention, circuits constituting a semiconductor integrated circuit for radio communication basically are divided into functional blocks as shown in FIG. 1. Power source control is performed for each functional block and performed also for a portion of the individual circuits. Firstly, the basic configuration of the divided functional blocks will be described below with reference to FIG. 1. This semiconductor integrated circuit includes a power source control circuit 24, a receiving-system high frequency block 25, a receiving-system voice band block 26, a transmitting-system voice band block 27, and a transmitting-system high frequency block 28.

The receiving-system high frequency block 25, which has a function of processing a receiving high frequency signal, includes a received signal input terminal 1, a local oscillator 2, a multiplier 3, an intermediate frequency signal bandpass filter 4, an intermediate frequency amplifier (LIM: Limiter amplifier) 5, an intermediate frequency detector (RSSI: Receiving Signal Strength Indicator) 6, a demodulator 7, and a noise detector 8. A received signal supplied to the received signal input terminal 1 and a local frequency signal output from the local oscillator 2 are input to the multiplier 3. The multiplier 3 generates an intermediate frequency signal based on the receiving signal and the local frequency signal. From an output of the multiplier 3, the intermediate frequency bandpass filter 4 separates the intermediate frequency signal. An output of the intermediate frequency bandpass filter 4 is input to the intermediate frequency amplifier 5, which amplifies the intermediate frequency signal. An output of the intermediate frequency amplifier 5 is input to the intermediate frequency detector 6, which detects a level of the intermediate frequency, and is also input to the demodulator 7, which demodulates the output. An output of the demodulator 7 is supplied to the receiving-system voice band block 26 and is also input to the noise detector 8, which detects a level of demodulation noise.

The receiving-system voice band block 26, which has a function of processing a received voice band signal, includes a received voice signal amplifier 9, a received voice signal bandpass filter 10, a voice signal power amplifier 11, and a voice signal output terminal 12. The received voice signal amplifier 9 amplifies an output of the demodulator 7. The resultant output is input to the received voice signal bandpass filter 10, which separates a received voice signal. An output of the received voice signal bandpass filter 10 is input to the voice signal power amplifier 11, which amplifies the output in order to drive a loudspeaker. The resultant output is input to the voice signal output terminal 12. Note that the voice signal power amplifier 11 also receives an output of a data signal amplifier 14 provided in the transmitting-system voice band block 27.

The transmitting-system voice band block 27, which has a function of processing a transmission voice band signal, includes a data signal input terminal 13, the above-mentioned data signal amplifier 14, a data signal lowpass filter 15, a voice signal input terminal 16, a transmission voice signal amplifier 17, a transmission voice signal bandpass filter 18, and a voice signal level detector 19. A data signal is input from the data signal input terminal 13 to the data signal amplifier 14, which amplifies the data signal. The data signal lowpass filter 15 separates the data signal from an output of the data signal amplifier 14. A transmission voice signal is input from the voice signal input terminal 16 to the transmission voice signal amplifier 17, which amplifies the signal. The transmission voice signal bandpass filter 18 separates the transmission voice signal from an output of the transmission voice signal amplifier 17. An output of the transmission voice signal amplifier 17 is input to the voice signal level detector 19, which detects a level of the transmission voice signal.

The transmitting-system high frequency block 28, which has a function of processing a transmission high frequency signal, includes a modulator 20, a transmission signal generator 21, a transmission output terminal 22, and a power source control signal input terminal 23. The modulator 20 receives an output of the data signal lowpass filter 15 and an output of the transmission voice signal bandpass filter 18, and performs modulation. The transmission signal generator 21 generates a transmission signal based on an output of the modulator 20 to which the outputs are input and outputs the transmission signal to the transmission output terminal 22.

The power source control circuit 24 has a function of performing power source control for operating/stopping each functional block or individual circuits. The power source control circuit 24 receives a power source control signal via the power source control signal input terminal 23, and performs power source control based on the power source control signal.

Hereinafter, the power source control of the present invention will be described by way of embodiments with reference to the accompanying drawings.

Embodiment 1

Figure 2:
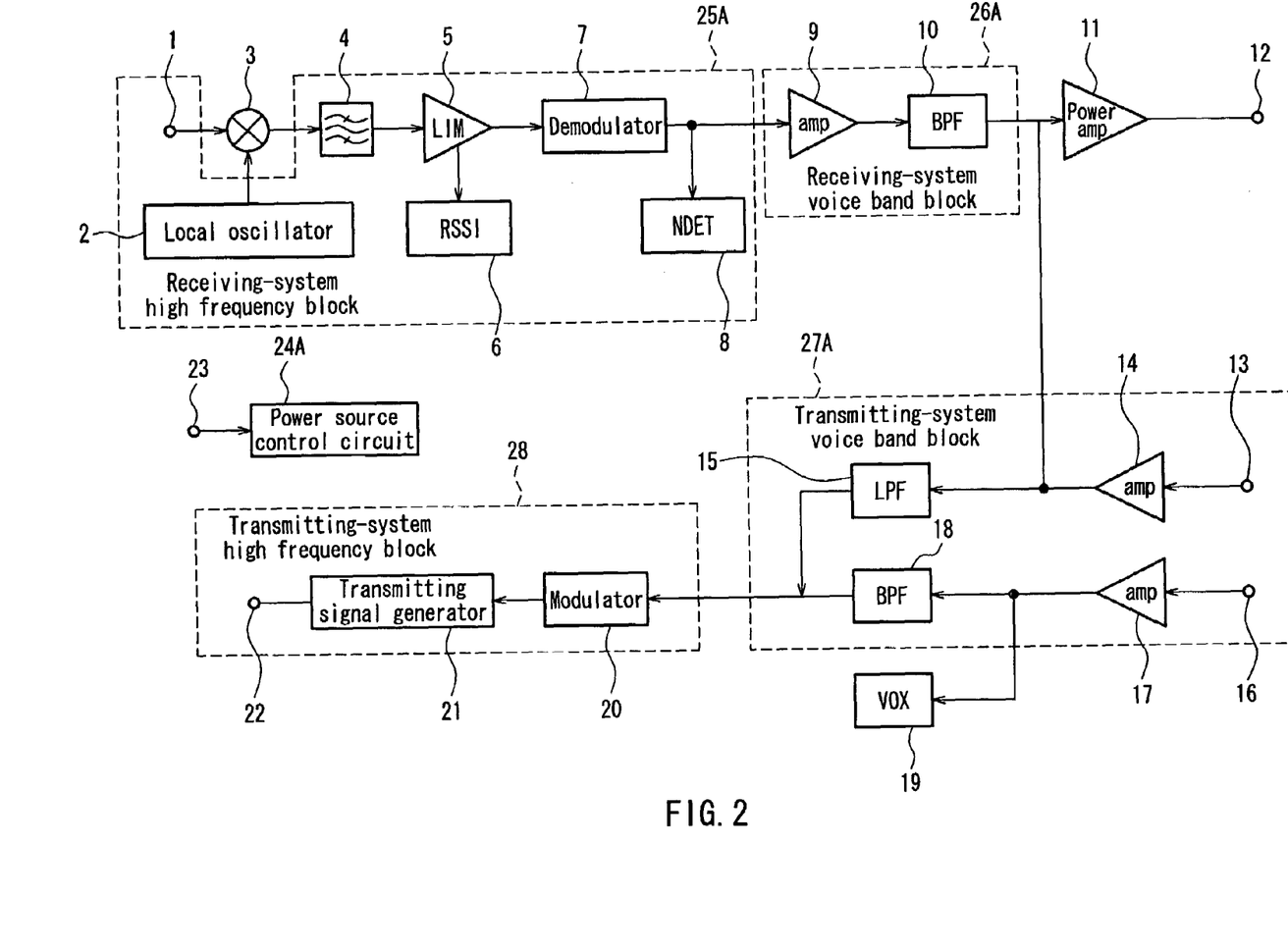
FIG. 2 is a block diagram showing a semiconductor integrated circuit for radio communication according to Embodiment 1 of the present invention.

FIG. 2 is a block diagram showing a semiconductor integrated circuit for radio communication according to Embodiment 1 of the present invention. In FIG. 2, the same element circuits as those of FIG. 1 are referenced with the same reference numerals and the explanation is not repeated. The semiconductor integrated circuit for radio communication of Embodiment 1 is different from that of FIG. 1 in that element circuits included in a receiving-system high frequency block 25A, a receiving-system voice band block 26A, and a transmitting-system voice band block 27A are changed, and accordingly, power source control is performed by a power source control circuit 24A. Table 1 shows the groups to be controlled based on this power source control system.

TABLE 1

| Groups to be controlled | Element circuits included in a block |
|---|---|
| 25A Receiving-system high frequency block | 2 Local signal generator<br>4 Intermediate frequency signal bandpass filter<br>5 Intermediate frequency amplifier<br>6 Intermediate frequency detector<br>7 Demodulator |
| 3 Multiplicator | — |
| 8 Noise detector | — |
| 26A Receiving-system voice band block | 9 Received voice signal amplifier<br>10 Received voice signal bandpass filter |
| 11 Voice signal power amplifier | — |
| 27A Transmitting-system voice band block | 14 Data signal amplifier<br>15 Data signal lowpass filter<br>17 Transmission voice signal amplifier<br>18 Transmission voice signal bandpass filter |
| 19 Voice signal level detector | — |
| 28 Transmitting-system high frequency block | 20 Modulator<br>21 Transmission signal generator |

The receiving-system high frequency block 25A includes a local oscillator 2, an intermediate frequency signal bandpass filter 4, an intermediate frequency amplifier 5, an intermediate frequency detector 6, and a demodulator 7, all of which are subjected to the same power source control by the power source control circuit 24A. The receiving-system voice band block 26A includes a received voice signal amplifier 9 and a received voice signal bandpass filter 10, all of which are subjected to the same power source control. The transmitting-system voice band block 27A includes a data signal amplifier 14, data signal lowpass filter 15, a transmission voice signal amplifier 17, and a transmission voice signal bandpass filter 18, all of which are subjected to the same power source control. The transmitting-system high frequency block 28 includes a modulator 20 and a transmission signal generator 21, all of which are subjected to the same power source control. A multiplier 3, a noise detector 8, a voice signal power amplifier 11, and a voice signal level detector 19 separately are subjected to power source control.

In the thus-constructed semiconductor integrated circuit for radio communication, the power source control circuit 24A performs power source control based on a control signal input via a power source control signal input terminal 23 such that the receiving-system high frequency block 25A, the receiving-system voice band block 26A, the transmitting-system voice band block 27A, the transmitting-system high frequency block 28, the multiplier 3, the noise detector 8, the voice signal power amplifier 11, and the voice signal level detector 19 are separately operated/stopped.

Figure 7:
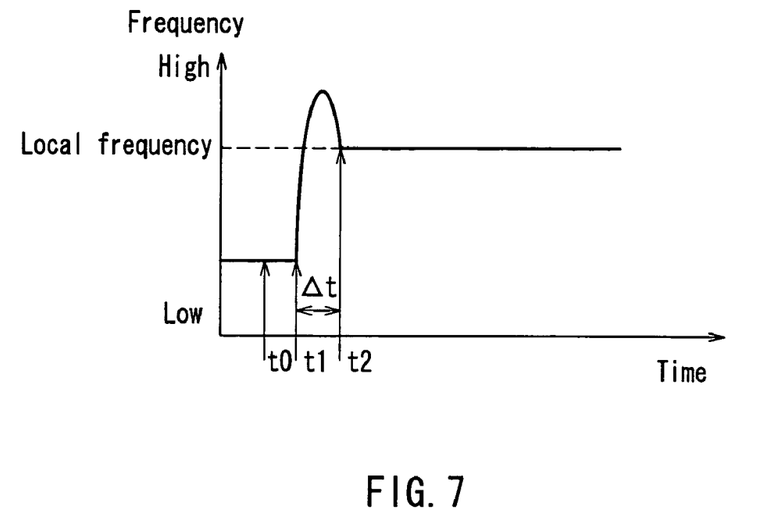
FIG. 7 is a diagram showing output frequency characteristics of a local oscillator in the semiconductor integrated circuits for radio communication of Embodiments 1 and 5 of the present invention.

FIG. 7 shows a frequency change of a local frequency signal output from the local oscillator 2 when the starts of operations of the receiving-system high frequency block 25A, which includes the local oscillator 2, and the multiplier 3 are controlled individually. t0 represents an operation start time of the multiplier 3. t1 represents an operation start time of the receiving-system high frequency block 27A. t2 represents a time at which the frequency of the local oscillator 2 becomes stable. Δt represents an interval between t1 and t2, indicating an elapsed time from the start of an operation of the receiving-system high frequency block 27A until the frequency of the local oscillator 2 becomes stable.

In Embodiment 1, as shown in FIG. 7, the multiplier 3 is started before the local oscillator 2. After the input impedance is stable, the local oscillator 2 is started. As a result, the time Δt required for the frequency of the local oscillator 2 to become stable can be reduced, so that rising characteristics of a power source are prevented from being deteriorated.

According to the thus-constructed power source control system, element circuits can be operated/stopped not only together as a block but also separately as individual circuits. Specifically, the multiplier 3, the noise detector 8, the voice signal power amplifier 11, and the voice signal level detector 19 are controlled individually. Thus, current consumption can be reduced and deterioration of the rising characteristics of power source can be suppressed.

Embodiment 2

Figure 3:
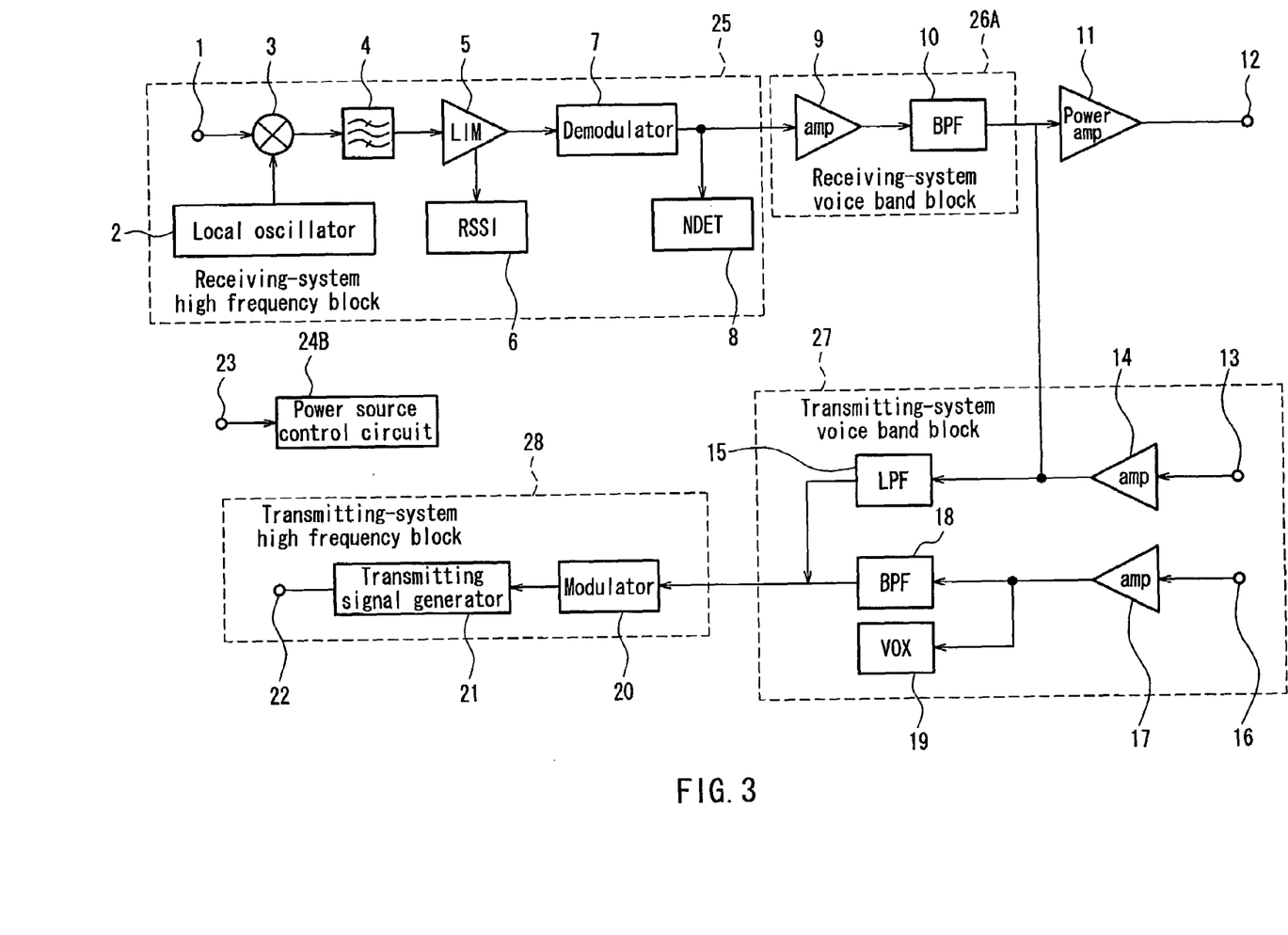
FIG. 3 is a block diagram showing a semiconductor integrated circuit for radio communication according to Embodiment 2 of the present invention.

FIG. 3 is a block diagram showing a semiconductor integrated circuit for radio communication according to Embodiment 2 of the present invention. In FIG. 3, the same element circuits as those of FIG. 1 are referenced with the same reference numerals and the explanation is not repeated. The semiconductor integrated circuit for radio communication of Embodiment 2 is different from that of FIG. 1 in that element circuits in a receiving-system voice band block 26A are changed, and accordingly, power source control is performed by a power source control circuit 24B. Table 2 shows the groups to be controlled based on this power source control system.

TABLE 2

| Groups to be controlled | Element circuits included in a block |
|---|---|
| 25 Receiving-system high frequency block | 2 Local signal generator |
| | 3 Multiplicator |
| | 4 Intermediate frequency signal bandpass filter |
| | 5 Intermediate frequency amplifier |
| | 6 Intermediate frequency detector |
| | 7 Demodulator |
| | 8 Noise detector |
| 26A Receiving-system voice band block | 9 Received voice signal amplifier |
| | 10 Received voice signal bandpass filter |
| 11 Voice signal power amplifier | — |
| 27 Transmitting-system voice band block | 14 Data signal amplifier |
| | 15 Data signal lowpass filter |
| | 17 Transmission voice signal amplifier |
| | 18 Transmission voice signal bandpass filter |
| | 19 Voice signal level detector |
| 28 Transmitting-system high frequency block | 20 Modulator |
| | 21 Transmission signal generator |

A receiving-system high frequency block 25 includes a local oscillator 2, a multiplier 3, an intermediate frequency signal bandpass filter 4, an intermediate frequency amplifier 5, an intermediate frequency detector 6, a demodulator 7, and a noise detector 8, all of which are subjected to the same power source control by a power source control circuit 24B. The receiving-system voice band block 26A includes a received voice signal amplifier 9 and a received voice signal bandpass filter 10, all of which are subjected to the same power source control. A transmitting-system voice band block 27 includes a data signal amplifier 14, a data signal lowpass filter 15, a transmission voice signal amplifier 17, a transmission voice signal bandpass filter 18, and a voice signal level detector 19, all of which are subjected to the same power source control. A transmitting-system high frequency block 28 includes a modulator 20 and a transmission signal generator 21, all of which are subjected to the same power source control. A voice signal power amplifier 11 is subjected individually to power source control.

In the thus-constructed semiconductor integrated circuit for radio communication, the power source control circuit 24B performs power source control based on a control signal input via a power source control signal input terminal 23 such that the receiving-system high frequency block 25, the receiving-system voice band block 26A, the transmitting-system voice band block 27, the transmitting-system high frequency block 28, and the voice signal power amplifier 11 are separately operated/stopped.

According to the thus-constructed power source control system, element circuits can be operated/stopped not only together as a block but also separately as individual circuits. Specifically, the voice signal power amplifier 11 is controlled individually. Thus, current consumption can be reduced.

Embodiment 3

Figure 4:
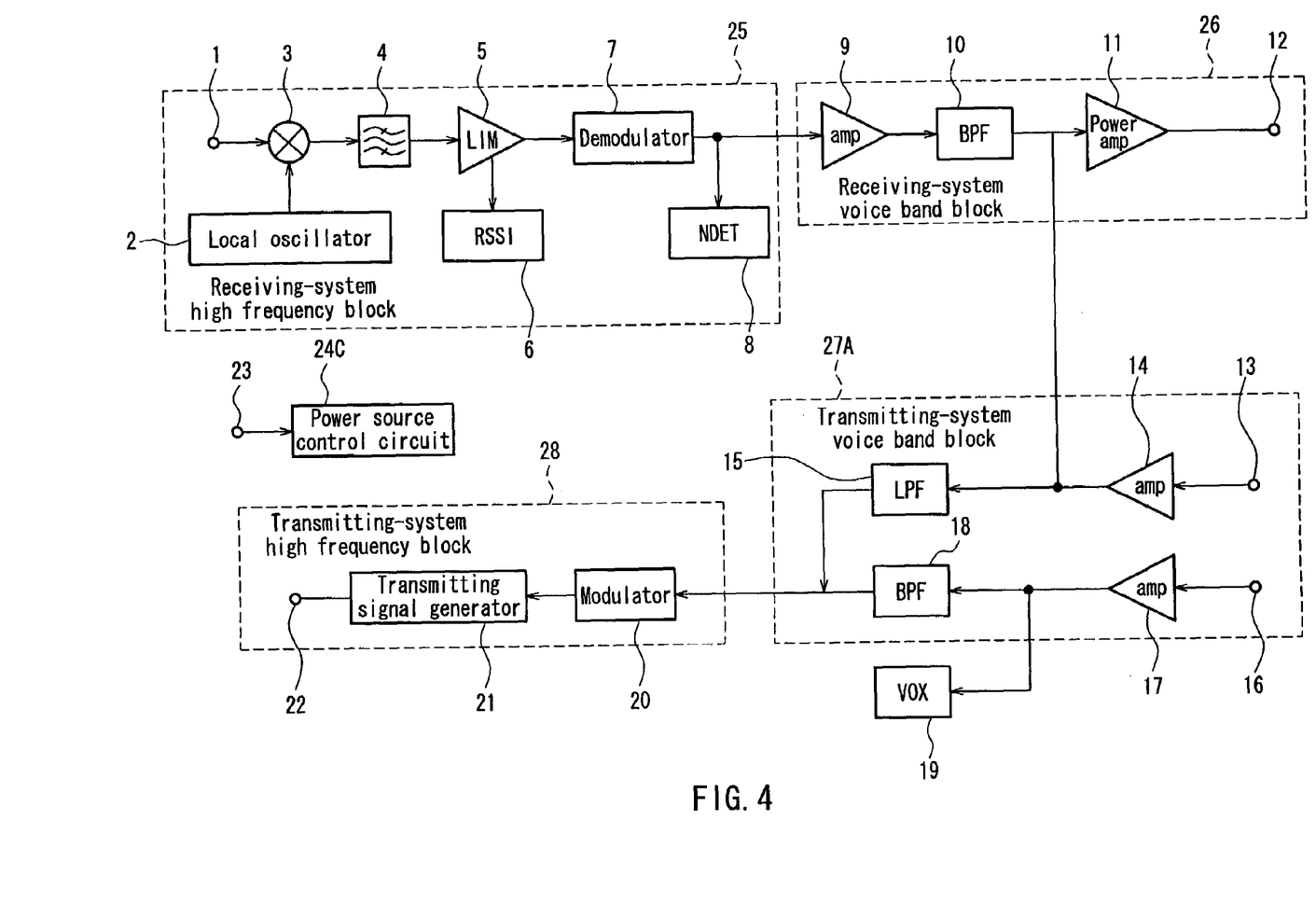
FIG. 4 is a block diagram showing a semiconductor integrated circuit for radio communication according to Embodiment 3 of the present invention.

FIG. 4 is a block diagram showing a semiconductor integrated circuit for radio communication according to Embodiment 3 of the present invention. In FIG. 4, the same element circuits as those of FIG. 1 are referenced with the same reference numerals and the explanation is not repeated. The semiconductor integrated circuit for radio communication of Embodiment 3 is different from that of FIG. 1 in that element circuits in a transmitting-system voice band block 27A are changed, and accordingly, power source control is performed by a power source control circuit 24C. Table 3 shows the groups to be controlled based on this power source control system.

TABLE 3

| Groups to be controlled | Element circuits included in a block |
|---|---|
| 25 Receiving-system high frequency block | 2 Local signal generator |
| | 3 Multiplicator |

TABLE 3-continued

| Groups to be controlled | Element circuits included in a block |
|---|---|
| | 4 Intermediate frequency signal bandpass filter |
| | 5 Intermediate frequency amplifier |
| | 6 Intermediate frequency detector |
| | 7 Demodulator |
| | 8 Noise detector |
| 26 Receiving-system voice band block | 9 Received voice signal amplifier |
| | 10 Received voice signal bandpass filter |
| | 11 Voice signal power amplifier |
| 27A Transmitting-system voice band block | 14 Data signal amplifier |
| | 15 Data signal lowpass filter |
| | 17 Transmission voice signal amplifier |
| | 18 Transmission voice signal bandpass filter |
| 19 Voice signal level detector | — |
| 28 Transmitting-system high frequency block | 20 Modulator |
| | 21 Transmission signal generator |

A receiving-system high frequency block 25 includes a local oscillator 2, a multiplier 3, an intermediate frequency signal bandpass filter 4, an intermediate frequency amplifier 5, an intermediate frequency detector 6, a demodulator 7, and a noise detector 8, all of which are subjected to the same power source control by the power source control circuit 24C. A receiving-system voice band block 26 includes a received voice signal amplifier 9, a received voice signal bandpass filter 10, and a voice signal power amplifier 11, all of which are subjected to the same power source control. The transmitting-system voice band block 27A includes a data signal amplifier 14, a data signal lowpass filter 15, a transmission voice signal amplifier 17, and a transmission voice signal bandpass filter 18, all of which are subjected to the same power source control. A transmitting-system high frequency block 28 includes a modulator 20 and a transmission signal generator 21, all of which are subjected to the same power source control. A voice signal level detector 19 is subjected individually to power source control.

In the thus-constructed semiconductor integrated circuit for radio communication, the power source control circuit 24C performs power source control based on a control signal input via a power source control signal input terminal 23 such that the receiving-system high frequency block 25, the receiving-system voice band block 26, the transmitting-system voice band block 27A, the transmitting-system high frequency block 28, and the voice signal level detector 19 are separately operated/stopped.

According to the thus-constructed power source control system, element circuits can be operated/stopped not only together as a block but also separately as individual circuits. Specifically, the voice signal level detector 19 is controlled individually. Thus, current consumption can be reduced.

Embodiment 4

Figure 5:
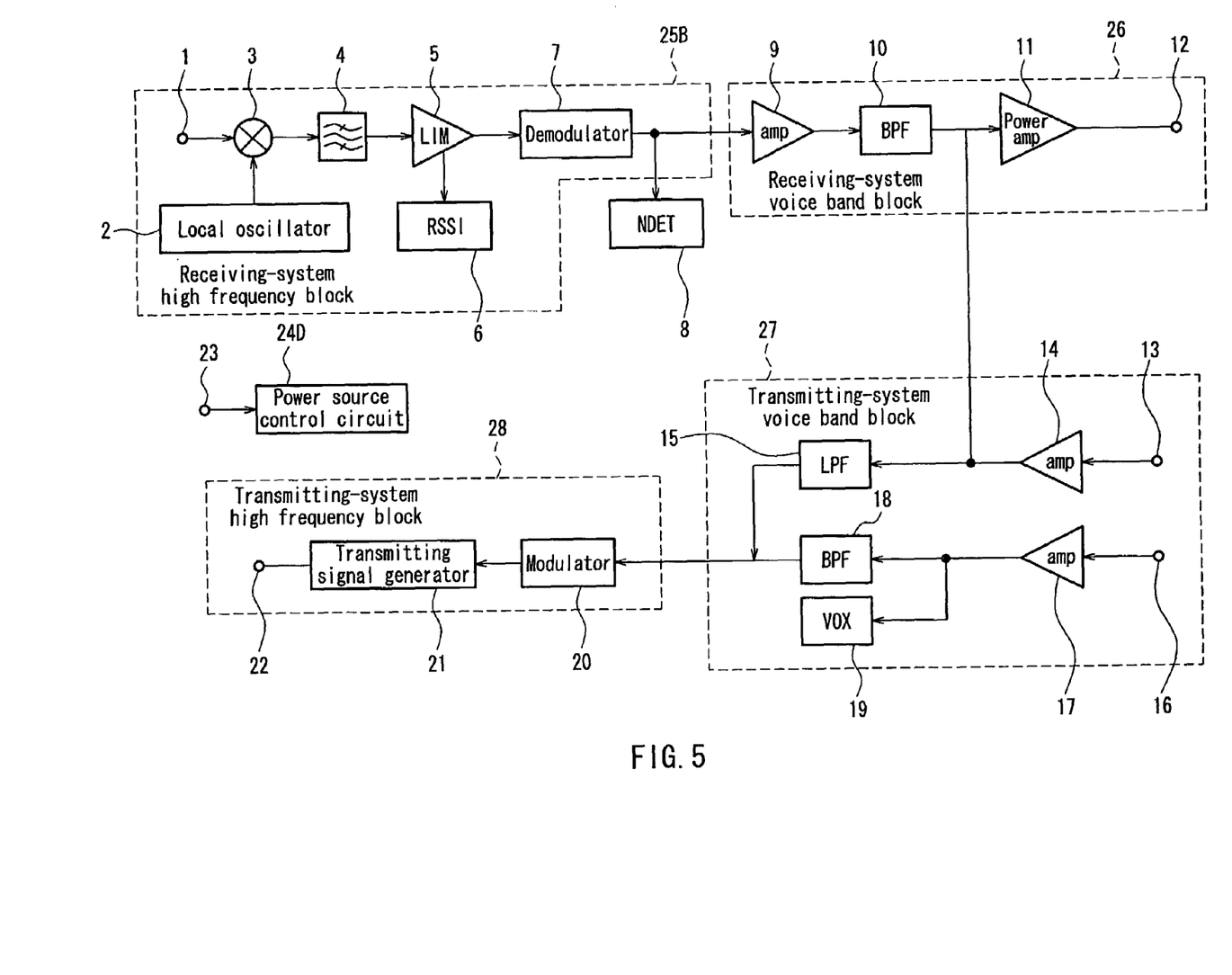
FIG. 5 is a block diagram showing a semiconductor integrated circuit for radio communication according to Embodiment 4 of the present invention.

FIG. 5 is a block diagram showing a semiconductor integrated circuit for radio communication according to Embodiment 4 of the present invention. In FIG. 5, the same element circuits as those of FIG. 1 are referenced with the same reference numerals and the explanation is not repeated. The semiconductor integrated circuit for radio communication of Embodiment 4 is different from that of FIG. 1 in that element circuits in a receiving-system high frequency block 25B are changed, and accordingly, power source control is performed by a power source control circuit 24D. Table 4 shows the groups to be controlled based on this power source control system.

TABLE 4

| Groups to be controlled | Element circuits included in a block |
|---|---|
| 25B Receiving-system high frequency block | 2 Local signal generator |
| | 3 Multiplicator |
| | 4 Intermediate frequency signal bandpass filter |
| | 5 Intermediate frequency amplifier |
| | 6 Intermediate frequency detector |
| | 7 Demodulator |
| 8 Noise detector | — |
| 26 Receiving-system voice band block | 9 Received voice signal amplifier |
| | 10 Received voice signal bandpass filter |
| | 11 Voice signal power amplifier |
| 27 Transmitting-system voice band block | 14 Data signal amplifier |
| | 15 Data signal lowpass filter |
| | 17 Transmission voice signal amplifier |
| | 18 Transmission voice signal bandpass filter |
| | 19 Voice signal level detector |
| 28 Transmitting-system high frequency block | 20 Modulator |
| | 21 Transmission signal generator |

The receiving-system high frequency block 25B includes a local oscillator 2, a multiplier 3, an intermediate frequency signal bandpass filter 4, an intermediate frequency amplifier 5, an intermediate frequency detector 6, and a demodulator 7, all of which are subjected to the same power source control by the power source control circuit 24D. A receiving-system voice band block 26 includes a received voice signal amplifier 9, a received voice signal bandpass filter 10, and a voice signal power amplifier 11, all of which are subjected to the same power source control. A transmitting-system voice band block 27 includes a data signal amplifier 14, a data signal lowpass filter 15, a transmission voice signal amplifier 17, a transmission voice signal bandpass filter 18, and a voice signal level detector 19, all of which are subjected to the same power source control. A transmitting-system high frequency block 28 includes a modulator 20 and a transmission signal generator 21, all of which are subjected to the same power source control. A noise detector 8 is subjected individually to power source control.

In the thus-constructed semiconductor integrated circuit for radio communication, the power source control circuit 24D performs power source control based on a control signal input via a power source control signal input terminal 23 such that the receiving-system high frequency block 25B, the receiving-system voice band block 26, the transmitting-system voice band block 27, the transmitting-system high frequency block 28, and the noise detector 8 are separately operated/stopped.

According to the thus-constructed power source control system, element circuits can be operated/stopped not only together as a block but also separately as individual circuits. Specifically, the noise detector 8 is controlled individually. Thus, current consumption can be reduced.

Embodiment 5

Figure 6:
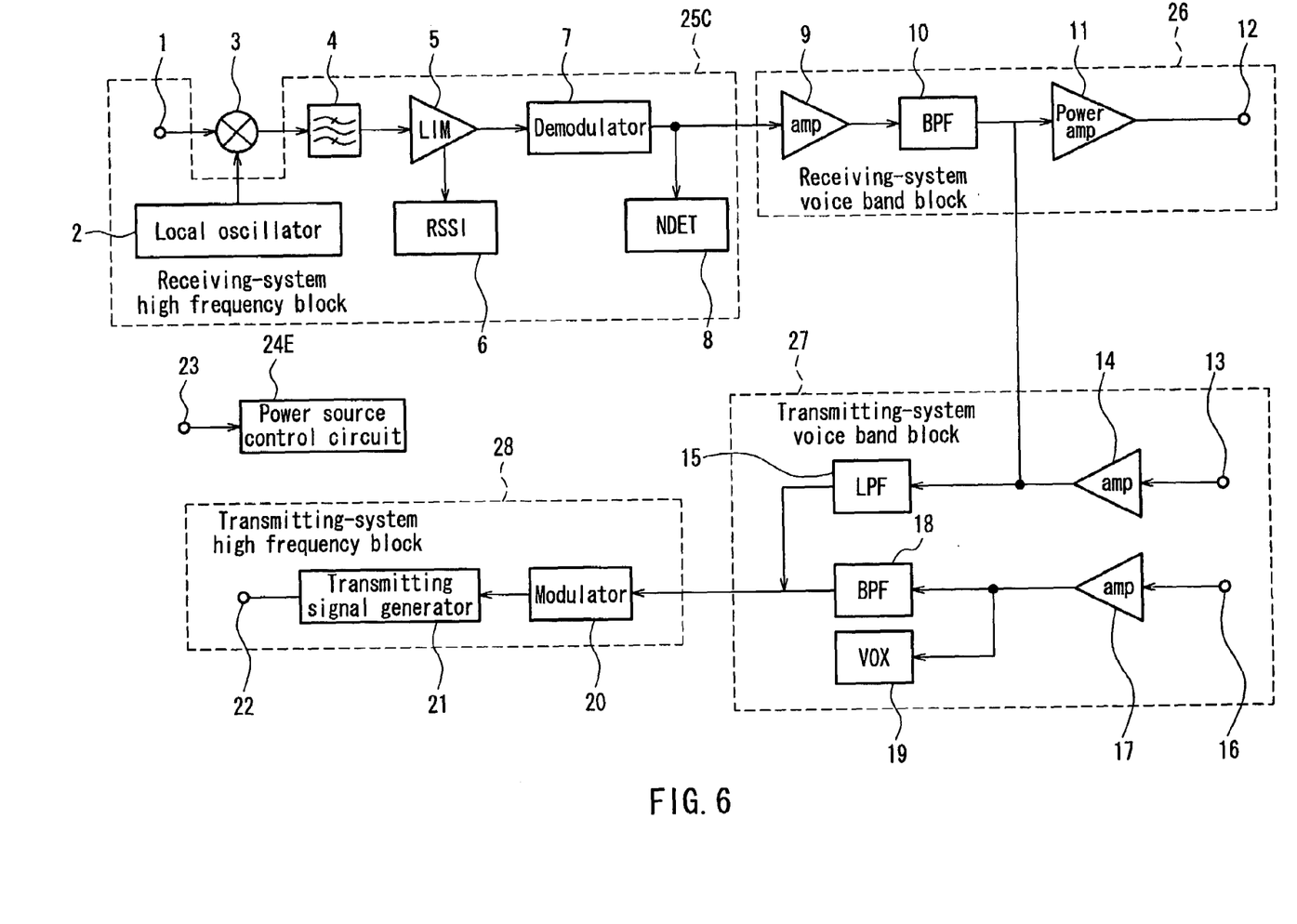
FIG. 6 is a block diagram showing a semiconductor integrated circuit for radio communication according to Embodiment 5 of the present invention.

FIG. 6 is a block diagram showing a semiconductor integrated circuit for radio communication according to Embodiment 5 of the present invention. In FIG. 6, the same element circuits as those of FIG. 1 are referenced with the same reference numerals and the explanation is not repeated. The semiconductor integrated circuit for radio communication of Embodiment 5 is different from that of FIG. 1 in that element circuits in a receiving-system high frequency block 25C are changed, and accordingly, power source control is performed by a power source control circuit 24E. Table 5 shows the groups to be controlled based on this power source control system.

TABLE 5

| Groups to be controlled | Element circuits included in a block |
|---|---|
| 25C Receiving-system high frequency block | 2 Local signal generator<br>4 Intermediate frequency signal bandpass filter<br>5 Intermediate frequency amplifier<br>6 Intermediate frequency detector<br>7 Demodulator<br>8 Noise detector |
| 3 Multiplicator | — |
| 26 Receiving-system voice band block | 9 Received voice signal amplifier<br>10 Received voice signal bandpass filter<br>11 Voice signal power amplifier |
| 27 Transmitting-system voice band block | 14 Data signal amplifier<br>15 Data signal lowpass filter<br>17 Transmission voice signal amplifier<br>18 Transmission voice signal bandpass filter<br>19 Voice signal level detector |
| 28 Transmitting-system high frequency block | 20 Modulator<br>21 Transmission signal generator |

The receiving-system high frequency block 25C includes a local oscillator 2, an intermediate frequency signal bandpass filter 4, an intermediate frequency amplifier 5, an intermediate frequency detector 6, a demodulator 7, and a noise detector 8, all of which are subjected to the same power source control by the power source control circuit 24E. A receiving-system voice band block 26 includes a received voice signal amplifier 9, a received voice signal bandpass filter 10, and a voice signal power amplifier 11, all of which are subjected to the same power source control. A transmitting-system voice band block 27 includes a data signal amplifier 14, a data signal lowpass filter 15, a transmission voice signal amplifier 17, a transmission voice signal bandpass filter 18, and a voice signal level detector 19, all of which are subjected to the same power source control. A transmitting-system high frequency block 28 includes a modulator 20 and a transmission signal generator 21, all of which are subjected to the same power source control. A multiplier 3 is subjected individually to power source control.

In the thus-constructed semiconductor integrated circuit for radio communication, the power source control circuit 24E performs power source control based on a control signal input via a power source control signal input terminal 23 such that the receiving-system high frequency block 25C, the receiving-system voice band block 26, the transmitting-system voice band block 27, the transmitting-system high frequency block 28, and the multiplier 3 are separately operated/stopped.

According to the thus-constructed power source control system, element circuits can be operated/stopped not only together as a block but also separately as individual circuits. Specifically, the multiplier 3 is controlled individually. Thus, current consumption can be reduced. In addition, as described in Embodiment 1 with reference to FIG. 7, rising characteristics of a power source can be prevented from being deteriorated.

The invention may be embodied in other forms without departing from the spirit or essential characteristics thereof. The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

What is claimed is:

1. A semiconductor integrated circuit for radio communication comprising:

a receiving-system high frequency block including a group of circuits for processing a received high frequency signal;

a receiving-system voice band block including a group of circuits for processing a received voice band signal;

a transmitting-system voice band block including a group of circuits for processing a transmission voice band signal;

a transmitting-system high frequency block including a group of circuits for processing a transmission high frequency signal; and a power source control circuit for performing power source control to operate/stop each of the groups of circuits based on a power source control signal, wherein the receiving-system high frequency block includes a local oscillator for outputting a local frequency signal, a multiplier for receiving an output of the local oscillator and the received signal as inputs and outputting an intermediate frequency signal, an intermediate frequency bandpass filter for separating an intermediate frequency signal from an output of the multiplier, an intermediate frequency amplifier for amplifying an intermediate frequency signal output from the intermediate frequency bandpass filter, an intermediate frequency detector for detecting a level of an intermediate frequency output from the intermediate frequency amplifier, a demodulator for demodulating a signal output from the intermediate frequency amplifier, and a noise detector for detecting a level of demodulation noise in a signal output from the demodulator, the receiving-system voice band block includes a received voice signal amplifier for amplifying a demodulation output of the demodulator, a received voice signal bandpass filter for separating a received voice signal from an output of the received voice signal amplifier, and a voice signal power amplifier for driving a loudspeaker based on an output of the received voice signal bandpass filter and an output of a data signal amplifier included in the group of circuits for processing the transmission voice band signal, the transmitting-system voice band block includes the data signal amplifier for amplifying a data signal, a data signal lowpass filter for separating a data signal from an output of the data signal amplifier, a transmission voice signal amplifier for amplifying a transmission voice signal, a transmission voice signal bandpass filter for separating a transmission voice signal from an output of the transmission voice signal amplifier; and a voice signal level detector for detecting a level of a transmission voice signal based on an output of the transmission voice signal amplifier, and the transmitting-system high frequency block includes a modulator for receiving and modulating an output of the data signal lowpass filter and an output of the transmission voice signal bandpass filter, and a transmission signal generator for outputting a transmission signal based on an output of the modulator, and wherein the power source control circuit performs individual power source control for at least one circuit of the multiplier, the noise detector, the voice signal power amplifier, and the voice signal level detector, and performs the power source control for each of the receiving-system high frequency block, the receiving-system voice band block, the transmitting-system voice band block, and the transmitting-system high frequency block, except for the at least one circuit subjected to the individual power source control.

2. The semiconductor integrated circuit for radio communication according to claim 1, wherein the power source control circuit performs individual power source control for each of the multiplier, the noise detector, the voice signal power amplifier, and the voice signal level detector, and performs the power source control for each of the receiving-system high frequency block except for the multiplier and the noise detector, the receiving-system voice band block except for the voice signal power amplifier, the transmitting-system voice band block except for the voice signal level detector, and the transmitting-system high frequency block.

3. The semiconductor integrated circuit for radio communication according to claim 1, wherein the power source control circuit performs individual power source control for the voice signal power amplifier, and performs the power source control for each of the receiving-system high frequency block, the receiving-system voice band block except for the voice signal power amplifier, the transmitting-system voice band block, and the transmitting-system high frequency block.

4. The semiconductor integrated circuit for radio communication according to claim 1, wherein the power source control circuit performs individual power source control for the voice signal level detector, and performs the power source control for each of the receiving-system high frequency block, the receiving-system voice band block, the transmitting-system voice band block except for the voice signal level detector, and the transmitting-system high frequency block.

5. The semiconductor integrated circuit for radio communication according to claim 1, wherein the power source control circuit performs individual power source control for the noise detector, and performs the power source control for each of the receiving-system high frequency block except for the noise detector, the receiving-system voice band block, the transmitting-system voice band block, and the transmitting-system high frequency block.

6. The semiconductor integrated circuit for radio communication according to claim 1, wherein the power source control circuit performs individual power source control for the multiplier, and performs the power source control for each of the receiving-system high frequency block except for the multiplier, the receiving-system voice band block, the transmitting-system voice band block, and the transmitting-system high frequency block.

* * * * *